(12) United States Patent
Iasillo et al.

(10) Patent No.: US 7,104,070 B2
(45) Date of Patent: Sep. 12, 2006

(54) LIQUID FUEL NOZZLE APPARATUS WITH PASSIVE WATER INJECTION PURGE

(75) Inventors: Robert J. Iasillo, Simpsonville, SC (US); Warren James Mick, Altamont, NY (US)

(73) Assignee: General Electric Company, Schenectady, NY (US)

( * ) Notice: Subject to any disclaimer, the term of this patent is extended or adjusted under 35 U.S.C. 154(b) by 301 days.

(21) Appl. No.: 10/708,455

(22) Filed: Mar. 4, 2004

(65) Prior Publication Data

US 2005/0193741 A1    Sep. 8, 2005

(51) Int. Cl.
*F02C 3/30* (2006.01)
*F02C 7/22* (2006.01)

(52) U.S. Cl. .............................. 60/775; 60/740; 60/776
(58) Field of Classification Search ............. 60/39.094, 60/39.55, 740, 742, 748, 775, 776
See application file for complete search history.

(56) References Cited

U.S. PATENT DOCUMENTS 5,784,875 A  *  7/1998  Statler ........................ 60/775

| | | | |
|---|---|---|---|
| 6,145,294 A | 11/2000 | Traver et al. | 60/39.02 |
| 6,397,602 B1 * | 6/2002 | Vandervort et al. | 60/737 |
| 6,438,963 B1 | 8/2002 | Traver et al. | 60/779 |
| 6,609,380 B1 | 8/2003 | Mick et al. | 60/776 |

* cited by examiner

*Primary Examiner*—Louis J. Casaregola
(74) *Attorney, Agent, or Firm*—Cantor Colburn, LLP

(57) ABSTRACT

In a gas turbine having a compressor, a combustor and a turbine, a gaseous fuel supply coupled to provide gaseous fuel to the combustor, a liquid fuel supply coupled to provide liquid fuel to the combustor via nozzle assembly. The nozzle assembly includes a plurality of passageways for flowing a fluid into the combustor, one of the passageways being an atomizing air passageway conduit interconnecting the atomizing air passageway to one of the plurality of passageways to enable fluid flow therebetween, while not allowing the flow of fluid back into the atomizing air passageway. High pressure air from the atomizing air passageway is diverted into one of the plurality of passageways via the conduit to protect the nozzle from ingestion of hot combustor gases, thus eliminating a need for a dedicated air purge system for that one of the plurality of passageways.

17 Claims, 5 Drawing Sheets

LIQUID FUEL NOZZLE APPARATUS WITH PASSIVE WATER INJECTION PURGE

BACKGROUND OF THE INVENTION

This invention relates to gas turbines, and more particularly, to a liquid fuel nozzle assembly having a passive protective purge for protecting the nozzle from damage when neither water nor active purge is flowing through the water passageway of the nozzle.

Industrial gas turbines often are capable of alternatively running on liquid and gaseous fuels. These gas turbines have fuel supply systems for both liquid and gas fuels, e.g., natural gas. The gas turbines generally do not simultaneously burn both gas and liquid fuels. Rather, when the gas turbine burns liquid fuel, the gas fuel supply is turned off and vice-versa. The fuel/water system that is not being used is usually purged with air.

Gas turbines that burn liquid fuels require a liquid fuel purge system to clear combustor fuel nozzles of liquid fuel. Air is typically used to actively purge unused combustor nozzle passages during turbine operation. Purge air supplied from an external source that is regulated by a control valve. When the fuel/water system is activated or deactivated during turbine operation, the purge air needs to be turned on or off. The purge air and fuel or water are generally not permitted to be "on" at the same time for safety reasons. Thus, when activating a fuel/water system, the purge air is shut "off" before the fuel is turned on, and when deactivating a fuel system, the fuel is shut "off" before the purge air is turned "on". This sequence results in a brief period during which there is neither fuel/water flow nor purge air, thus opening the possibility of ingesting combustion gases into the fuel nozzle assembly. The brief no-flow period may also cause thermal distress of the fuel nozzle.

In one existing approach, the time-period during which both the fuel/water and-purge air are "off" is minimized for preventing fuel nozzle damage during a brief no-flow period. There are practical limits, however, as to how short this time-period can be set. Also, flowing purge air quickly into a fuel system that is full of fuel due to a prior operation may force the left over fuel into the combustor and produce an undesirable surge in turbine output. Further, the turbine control system requires some minimum time to confirm that a fuel valve or a purge air valve is in fact closed before opening the control valve to the other. The flowing of purge air quickly into a water system that is full of water due to prior operation, may force the left over water into the combustions system in this case producing the undesirable flaming out of the combustion system.

In another existing approach, a portion of combustor inlet air is diverted to wash over an outer exit of a fuel nozzle passage so that any back-flow into the nozzle will consist only of air and not hot combustion products. This approach, however, is not only difficult to implement but also includes performance side effects.

The systems that control the air purges and liquid flows are both complex and expensive. Currently, there are separate purge supplies to the atomizing air, liquid fuel (e.g., oil), and water passages. Currently, the oil and water passages are actively purged whenever oil or water are not flowing. The oil purge has shown to be crucial to thermally protect the oil tip and also to scavenge oil out of the oil passages following oil operation. While the water tip also requires thermal protection, there is no need to scavenge residual water from the water passages, as it cannot cause a problem equivalent to oil coking. With no water scavenge requirement, an independent or dedicated externally applied purge of the water passage is not necessary provided the water tip can be thermally protected by other means.

Therefore, there is a need for a system and method for a water nozzle that will thermally protect the water nozzle tip and eliminate a need for a dedicated externally supplied air purge of the water passages.

BRIEF DESCRIPTION OF THE INVENTION

The above discussed and other drawbacks and deficiencies are overcome or alleviated in an exemplary embodiment by a liquid fuel nozzle assembly having a passive protective purge in place of a dedicated active purge in order to protect the nozzle from damage during periods when water is not flowing through the water passageway of the nozzle.

In accordance with one embodiment of the present invention, there is provided an apparatus and method for purging a liquid fuel nozzle and protecting the same from backflowing combustion gases during a transition period when neither liquid fuel nor active purge are flowing through the nozzle. Specifically, a gas turbine includes a compressor, a combustor and a turbine, a liquid fuel unit for flowing liquid fuel into the combustor via a nozzle assembly. The nozzle assembly includes passageways for flowing a liquid fuel, water injection and high pressure air, respectively, into the combustor; a conduit interconnecting the water injection passageway and the high pressure air passageway enabling diversion of at least a portion of the high pressure air flow from the high pressure air passageway into the water injection passageway via the conduit to protect the nozzle from ingestion of hot combustor gases; a first swirler arranged in the water injection passageway; and a first end of the conduit being coupled to the water injection passageway downstream of the first swirler and an opposite second end of the conduit being in communication with the high pressure air passageway, the first end of the conduit being in communication with the water injection passageway downstream of the first swirler.

In another embodiment, a method for operating a dual fuel gas turbine having a combustor, a compressor and a turbine is disclosed. The method includes supplying liquid fuel to the combustor via a nozzle having a plurality of passageways, one of the passageways being a water injection passageway; interconnecting the water injection passageway to one of the plurality of passageways via a conduit to enable fluid flow therebetween, the one of the plurality of passageways flowing high pressure air; and protecting the nozzle from ingestion of backflow combustion gases by diverting high pressure air from the one of the plurality of passageways into the water injection passageway via the conduit.

In its broader aspects a dual-fuel gas turbine having a compressor, a combustor, and a turbine, a method of protecting a liquid fuel nozzle from ingestion of backflow combustion gases is disclosed. The method includes flowing water into the combustor via a water injection passageway; flowing high pressure air into the combustor via a first passageway; and interconnecting the first passageway and the second passageway via a conduit to direct flow of high pressure air from the first passageway to the second passageway into the combustor.

In yet another aspect, in a dual-fuel gas turbine having a compressor, a combustor and a turbine, a method of passively protecting a liquid fuel nozzle is disclosed. The method includes flowing a liquid fuel, water injection, and atomizing air into the combustor via respective nozzle passageways; coupling the water injection and the atomizing air passageways to one another via a conduit; diverting at least a portion of high pressure air from the atomizing air passageway into the water injection passageway to protect the nozzle from ingestion of hot combustor gases; disposing first and second swirler units for the water injection and atomizing air passageways, respectively, adjacent exit ends thereof; coupling a first end of the conduit to the water injection passageway at a location downstream of the first swirler unit in the water injection passageway; and coupling an opposite second end of the conduit to the atomizing air passageway at a location upstream of a second swirler unit in the atomizing air passageway.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DETAILED DESCRIPTION OF THE INVENTION

Figure 1:
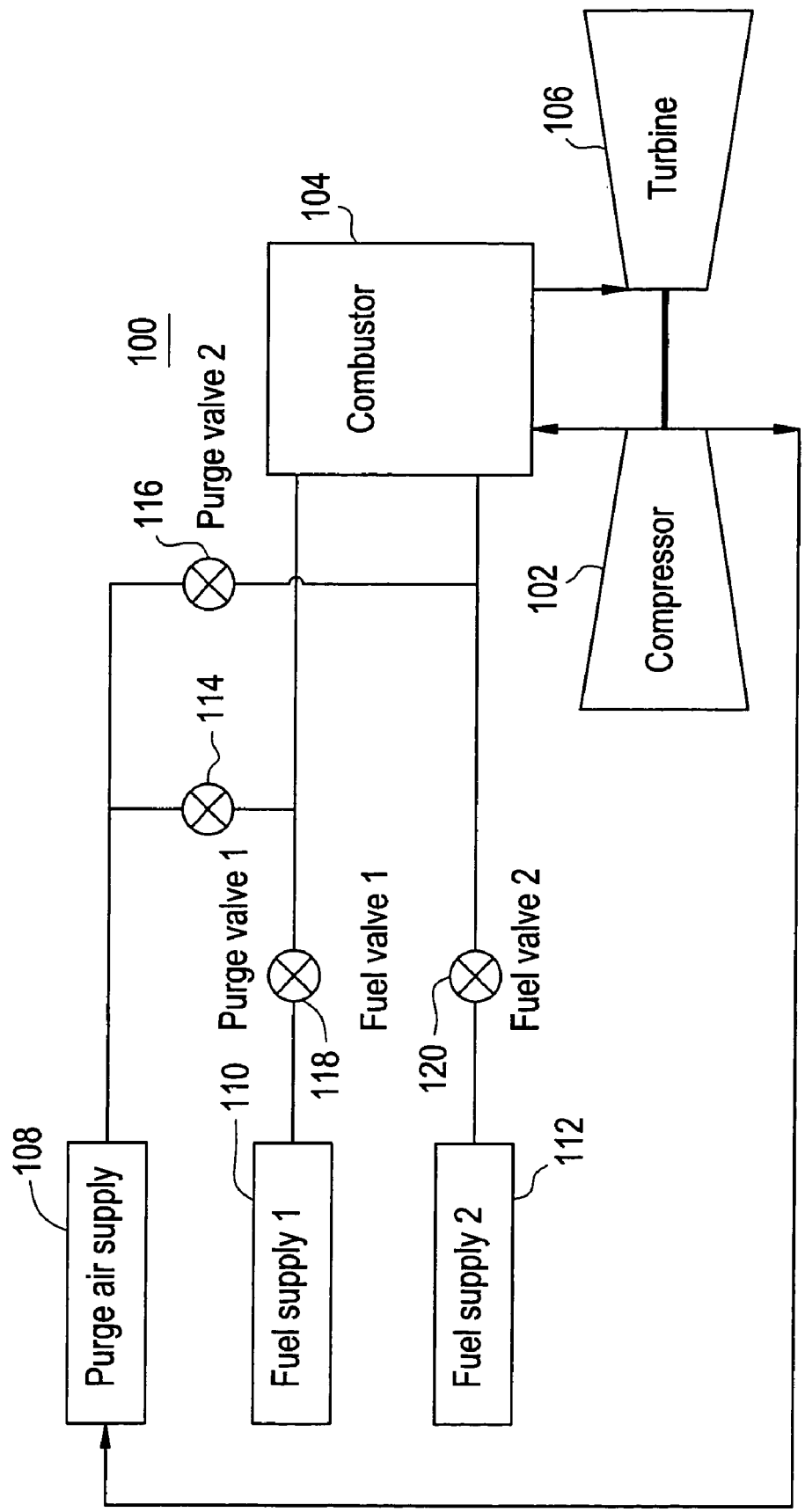
FIG. 1 shows a schematic of an exemplary dual fuel gas turbine engine system with purge mechanism.

FIG. 1 shows schematically a gas turbine 100 having a compressor 102, a combustor 104, and a turbine 106. The gas turbine 100 further includes a purge air supply system 108, a first fuel supply system 110, and a second fuel supply system 112. Fuel valves 118, 120 regulate supply of fuel from first and second fuel supply systems 110, 112, respectively. Similarly, purge valves 114, 116 regulate the supply of purge air from the purge air supply system 108 to supply lines carrying fuel from fuel supply systems 110, 112, respectively, into the combustor 104.

Figure 2:
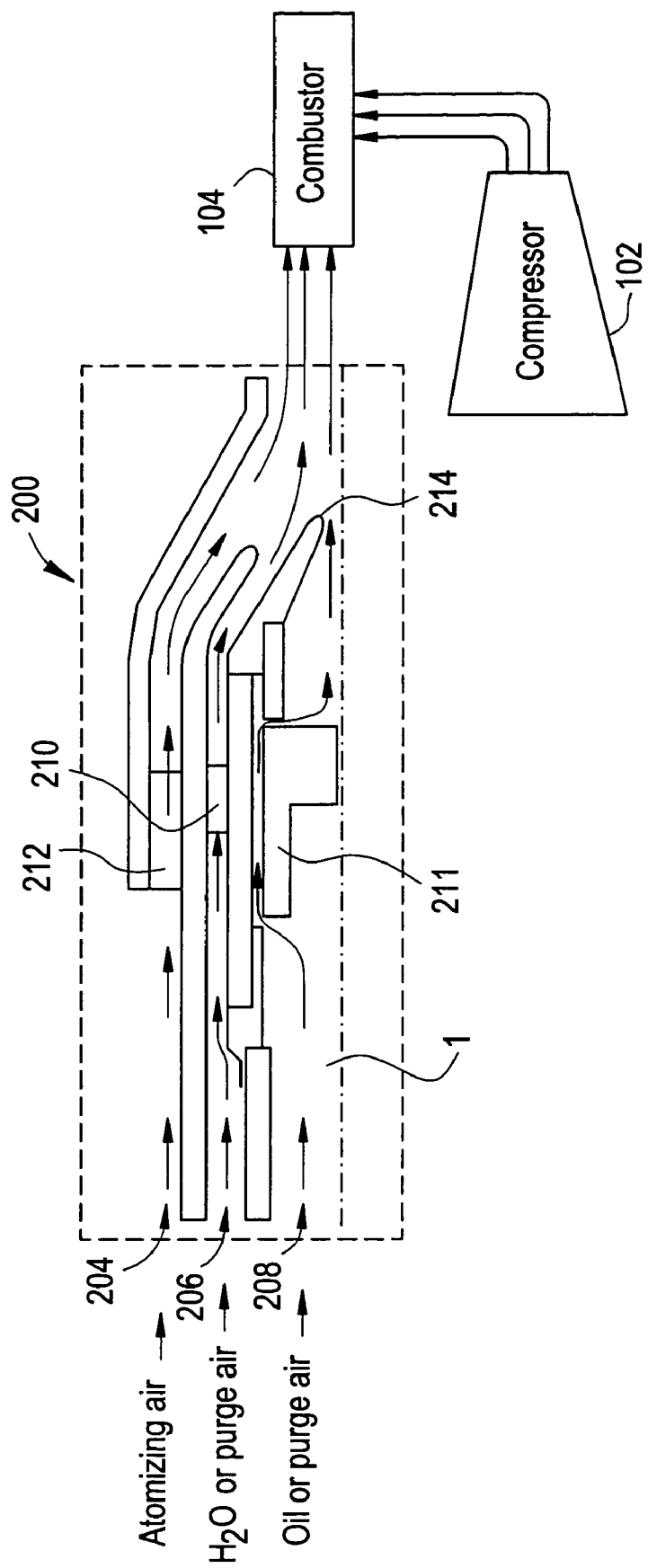
FIG. 2 shows a cross-sectional view of a typical three passageway liquid fuel nozzle cartridge.

FIG. 2 shows a cross-sectional view of a conventional liquid fuel nozzle cartridge 200 having three-passageways 204, 206, 208 for flowing fluids into combustor 104. The first passageway 204 flows atomizing air into combustor 104, the second passageway 206 flows water or purge air into the combustor 104, and the fuel passageway 208 flows liquid fuel or purge air into the combustor. Each of the three passageways 204, 206, and 208, respectively, are isolated from one another. Passageways 204, 206 and 208 are provided with respective restriction units ("swirler units") 212, 210, and 211, each swirler unit acting as a primary pressure drop and causing fluid to swirl as it exits the passageways.

Figure 3:
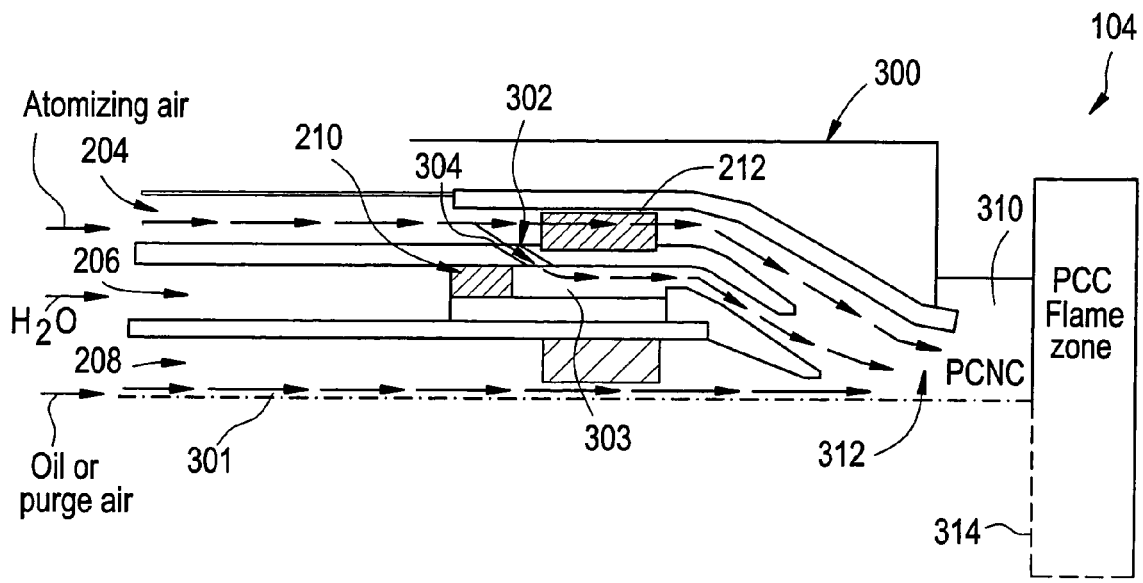
FIG. 3 shows a cross-sectional view of a liquid fuel nozzle cartridge having three passageways in accordance with an exemplary embodiment of the present invention operating with liquid fuel flow and no water injection flow.

FIG. 3 shows a cross-sectional view of a liquid fuel nozzle cartridge 300 having three passageways in accordance with an exemplary embodiment of the present invention. Fuel nozzle cartridge 300 is shown to include a first passageway 204 for flowing atomizing air, a second passageway 206 for flowing water or purge air down stream of swirler 210, and a third passageway 208 ("fuel passageway") for flowing liquid fuel or purge air, generally indicated with flow arrow 301, into the combustor 104 (FIG. 1). It will be recognized that FIG. 3 illustrates atomizing air flow in first passageway 204 and second passageway 206 down stream of swirler 210, while there is liquid fuel flow in fuel passageway 208. There is no water injection in second passageway 206 as illustrated in FIG. 3. A crossover passageway or conduit 302 connects the first passageway 204 and the second passageway 206 allowing fluid flow from one to the other. A first end 303 of the conduit 302 is connected to the second passageway 206 at a location that is downstream of the swirler 210, and a second end 304 of the conduit 302 is connected to the first passageway 204 at a location that is upstream of the swirler 212. This arrangement results in fluid flow (e.g., atomizing air) from the first passageway 204 to the second passageway 206 as the first passageway is maintained at a higher pressure relative to the second passageway.

More specifically, with reference to FIGS. 2 and 3, it will be recognized with respect to the change in configurations therebetween that the water injection swirler 210 is disposed upstream far enough to permit the cross over passageway 302 upstream of the atomizing air swirler 212 and down stream of the water injection swirler 210. This configuration illustrated in FIG. 3 provides the pressure balance to always keep the atomizing air in first passage way 204 upstream of swirler 212 at a higher pressure than the water injection through second passageway 206 downstream of swirler 210. This configuration also provides enough flow/pressure to keep the liquid fuel down stream of its pressure drop or respective swirler 211 from moving back upstream into the water injection passageway 206.

Because the atomized air flow through first passageway 204 is always ON, unlike the purge flows which are turned on/off, the bypass or crossover passageway 302 never turns off, and will always cool the water injection nozzle tips in a pressure combustor nozzle chamber (PCNC) zone 310 which substantially corresponds with a spin chamber 312 of nozzle 300. This cooling will occur during the transients of water on/off, as there is no time delay waiting for the purge system to close or open. The PCNC zone 310 is adjacent combustor 104 and is where the flows from the passageways 204, 206, 208 come together prior to entering the combustor zone of combustor 104. The combustor zone or pressure combustion chamber (PCC) includes a PCC flame zone 315 where the actual burning of the fuel takes place.

An additional benefit from having to purge second passageway 206 down stream of the water injection swirler 210 includes a reduced risk of blowing out the combustion system when an active dedicated purge for second passageway 206 is turned on. The pushing of water into the flame front of the PCC flame zone 315 at low loads, such as after a load rejection, has often resulted in the extinction of a flame in the combustion chamber. After water injection is turned OFF, any remaining water upstream of the swirler 210 evaporates over time and is introduced slowly into the combustion process.

Figure 4:
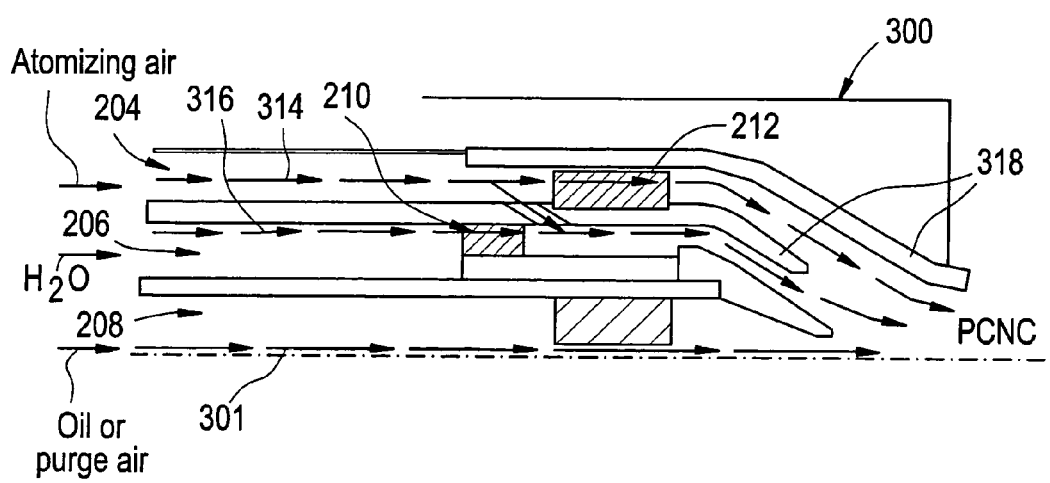
FIG. 4 shows a cross-sectional view of the liquid fuel nozzle cartridge of FIG. 3 operating with both liquid fuel flow and water injection flow.

Referring now to FIG. 4, nozzle cartridge 300 is illustrated with liquid fuel flow and water injection flow, while atomizing air is continually flowing as discussed above. It will be recognized that FIG. 4 illustrates atomizing air flow in first passageway 204 and conduit 302 down stream of swirler 210 indicated generally with flow arrow 314, while there is liquid fuel flow 301 in fuel passageway 208. Water injection flow in second passageway 206 is indicated generally with flow arrow 316 in second passageway 206 as illustrated in FIG. 3.

It will be recognized that the sizing of the nozzle cartridge 300 and operating pressures between passageways 204, 206, 208 are is important when either or both liquid fuel flow 301 and/or water injection flow 316 are present. The atomizing air flow 314 operates in a boosted mode that includes high flow and high pressure of flow 314 whenever liquid fuel flow 301 or water injection flow 316 is present. During a mode when water injection flow 316 is activated as illustrated in FIG. 4, the high pressure of the atomizing air upstream of the nozzle tip corresponding with spin chamber 312 is at a pressure greater than any pressure down stream of the water injection swirler 210 while water is flowing. In this manner, water will not be able to travel backwards up through conduit 302 into the first passageway 204 flowing atomizing air.

In the event of a failure, such as an atomizing motor failure when the atomizing air pressure may approach a compressor discharge pressure, any water which would find its way up into first passageway 204 via conduit 302 would not cause any damage during a short time period in which it would take to turn off the water injection flow 316.

More specifically, atomizing air pressure is monitored generally indicated at 501 such that any failure that is detected, water injection flow 316 is simply turned off limiting any risk to atomizing air tips 318 of nozzle 300 and first passageway 204 upstream therefrom. Since a combustor unit running on liquid fuel cannot operate for more than about a few seconds to about a few minutes without atomizing air at some minimal pressure, the risk of liquid fuel entering the water or second passageway 206 is of low risk.

Figure 5:
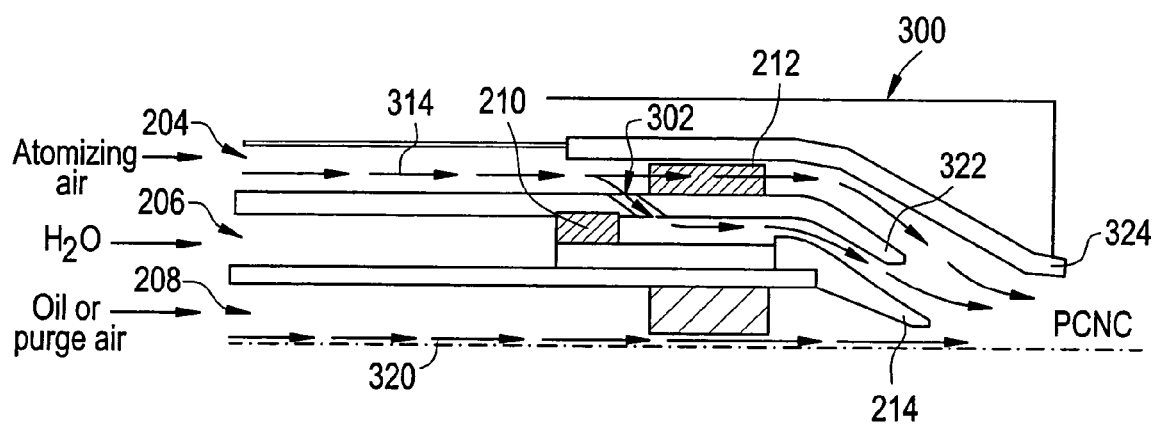
FIG. 5 is a cross-sectional view of the liquid fuel nozzle cartridge of FIG. 3 operating with purge air only absent any liquid fuel flow and water injection flow.

FIG. 5 illustrates nozzle cartridge 300 having neither liquid fuel flow 301 nor water injection flow 316 as in FIG. 4, but having purge air only. More specifically, FIG. 5 illustrates nozzle cartridge 300 operating in a gas fuel mode. This mode includes liquid fuel passageway 208 having a flow of purge air generally indicated with flow arrow 320 from a dedicated liquid fuel purge air system (see FIG. 6). Atomizing air flow 314 flows through first passageway 204 and a small amount of atomizing air flow 314 flows in second passageway 206 via crossover conduit 302 down stream of swirler 210 to provide purge air therethrough and extra cooling to a water injection tip 322. Even though the cooling provided by atomizing air in first passageway 204 and purge air in fuel passageway 208, is enough to prevent any damage to the water injection tip 322 by the cooling flow on both sides, the small amount of extra air from the atomizing air flow 314 redirected into the second passageway via conduit 302 increases the overall flow and cools both sides of the liquid fuel tip 214 and an water injection tip 324.

The actual burning of the gas fuel is in the PCC flame zone 315 as described above with reference to burning the liquid fuel. Backflow into the PCNC zone 310 can cause the most damage to the nozzle cartridge 300. The shape of the parts if distorted by heat or coking formations will greatly affect the performance of the fuel nozzle under liquid fuel operation. The interaction of the flows, shear layers, atomization and spray pattern coming out of the PCNC zone 310 directly affects such things as the ability to light the fuel, emission, system turndown at low load performance, and even the pattern or shape of the flame structure down stream, which has a direct impact on the life of the turbine parts.

When the operation of the gas turbine 100 is switched from liquid fuel to gaseous fuel in a system that has eliminated a dedicated water injection purge air system, purge air flowing down stream of swirler 210 through second passageway 206 continues to flow to purge the second passageway 206 downstream of swirler 210 and provide cooling for tips 214 and 322. A portion of the atomizing air from the first passageway 204 is diverted into the second passageway 206 down stream of swirler 210, via conduit 302, to prevent ingestion of hot combustion gases into the nozzle, thereby protecting fuel nozzle tip 214 and water injection tip 322 from hot gas ingestion. Small amounts of purge air may still be flowing through conduit 302 into second passageway 206 even after water injection starts flowing through the second passageway 206. This, however, has a negligible effect on the operation of the gas turbine 100. This air would act to atomize the water prior to entering the spin chamber PCNC 312.

Accordingly, an exemplary embodiment of a liquid fuel nozzle has been described that does not require a dedicated purge system for the water injection passageway, or in effect makes it a purge-less water passageway, while still meeting the cooling requirements, and providing backflow protection. The elimination of a dedicated water injection purge is possible resulting in substantial material cost savings and elimination of possible system failures, which can cause the shutting down of the gas turbine, loss of revenue and generation of power. Furthermore, a malfunction of the purge system can not cause excessive rapid water introduction, leading to a combustor flame out.

Although FIGS. 3–5 illustrate a fuel nozzle cartridge having three passageways, one skilled in the art will appreciate that the present invention may be practiced in a fuel nozzle having more than three passageways. The present invention may be implemented in any nozzle cartridge design having the availability of high pressure air supply so that a portion of the high pressure air may be diverted from a selected passageway carrying high pressure air into a water injection or liquid fuel passageways to prevent ingestion of hot gases into the nozzle and thereby protect fuel nozzle tips 214 and 322 defining a downstream end portion of second passageway 206 from hot gas ingestion.

Advantages of air purge include (a) scavenging out any residual fuel left from a prior operation, (b) cooling fuel system components and (c) preventing ingestion of combustion gases through the fuel nozzles.

Figure 6:
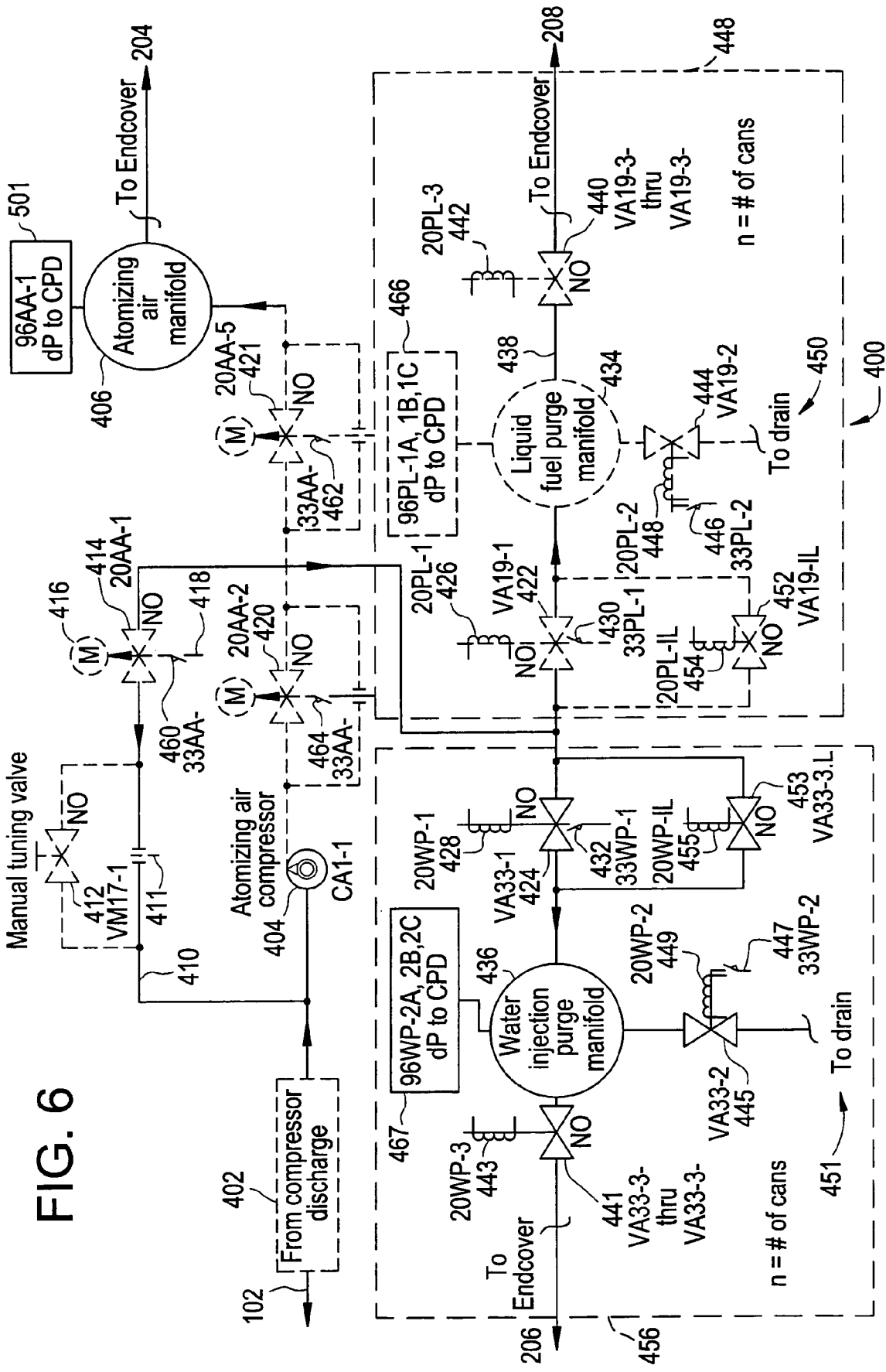
FIG. 6 is a diagram showing schematically purge systems for liquid fuel and water injection systems in a prior system illustrating removal of components involved with the water injection purge system in accordance with exemplary embodiment of the present invention.

Referring now to FIG. 6, a purge system 400 is illustrated, as described in U.S. Pat. No. 6,145,294 to the same assignee as the present application that embodies the current implementation of the gas turbine system shown in FIG. 1. The purge system receives cooled and filtered air from a compressor discharge port 402 of the main compressor 102. An atomizing air compressor bypass line 410 provides compressor discharge air for the purge system. The by-pass line may include a manual tuning valve 412 and a restriction orifice 411 that provides manual control over the pressure and flow rate of the compressor discharge air being supplied as purge air to the purge system. The pressure of the purge air is no greater than the pressure of the compressor air from port 402, because the purge system does not require a booster purge compressor. A motor (M) actuated bypass valve 414 is powered by a motor 416 and operated by controller (not shown), where switch 418 provides position feedback.

The compressor discharge 402 used by the purge system is shared with the atomizing air compressor 404 that supplies boosted atomizing air to the liquid fuel nozzles via an atomizing air manifold 406 and to the atomizing air ports of the liquid fuel nozzles. The atomizing air compressor and, in particular, the pressure ratio for atomizing air, are controlled by motor operated valves 414, 420, and 421 that are operated by the controller. The atomizing air assists in breaking up the flow of liquid fuel into an atomized mist that is most efficiently and quickly burned. The atomizing air compressor is not needed when the gas turbine burns a gaseous fuel, because the gaseous fuel is naturally in a gaseous state and does not need to be atomized. The atomizing air pressure ratio is controlled by valves 420, 421, the operation of the valves controls the atomizing air system pressure during transient conditions.

While the gas turbine burns gaseous fuel, the compressor discharge air 402 bypasses the inactive atomizing air compressor since the motorized valve 420 has been closed and the motor actuated bypass valve 414 has been opened. The main controller operates both of the motor actuated valves 414, 420.

The main compressor discharge 402 is an inherently reliable air source. Purge air flows through the bypass line 410 to the main purge feed valves 422, 424 for purging the liquid fuel and water injection systems, respectively. These main feed valves are normally open, with the amount of purge air flowing through the valves depending on the settings of the main bypass valve 414 and the atomizing air valve 420. The flow of purge air starts when valve 414 is opened, such as during a transition from burning liquid fuel to gaseous fuel in the combustor.

Online adjustment of the purge pressure ratio is provided by a manual tuning valve 412 that can be manually closed to restrict and is adjust the purge flow with the purge systems online. Because the purge flow can be controlled online, the mechanical components of the purge system may be designed with a generous flow margin above the specific flow margin to which the system is designed. During operation of the purge system, the manual flow valve 412 can be tuned down to a precise purge flow to minimize any adverse combustion effects, such as on combustion dynamics or flame stability.

The purge feed valves 422, 424 are controlled with solenoid valves 426, 428, respectively. When these solenoid valves are actuated by the controller, the actuating air is used to actuate the purge feed valves 422, 424, with limit switches 430, 432 monitoring the positions of the valves 422, 424.

Downstream of the purge feed valves 422, 424, are the purge manifold 434 for the liquid fuel system and nozzles and the purge manifold 436 for the water injection system and nozzles. The manifolds 434, 436 distribute the purge air to each of the fuel and water injection nozzles in each combustion can disposed in combustor 104 and nozzles 300. To prevent backflow of fuel and water into the purge system, each purge line 438, 439 is equipped, respectively, with a (normally open) pneumatically-actuated isolation valve 440 and 441.

There is a pair (for liquid fuel and water injection) of purge lines and associated isolation valves 440 and 441 for each combustion can in combustor 104 of the gas turbine. The purge lines 438, 439 extend from their respective purge manifolds 434, 436 to the combustion can where nozzles 300 are located. The isolation valves 440 and 441 are low pressure loss valves which are much less sensitive to contamination than are the previous poppet valve and check valves they replace.

A pair of solenoid valves 442 and 443 for manifolds 434, 436 provides the actuation air to all of the isolation valves 440 and 441 associated with its respective manifold. In addition, the manifolds are equipped with (normally closed) small drain valves 444 and 445, with a limit switch 446 and 447 that monitors and limits the position of the drain valves. The drain valves are controlled by solenoids 443 and 449 which are operated by the controller. The drain valves 444 and 445 have discharge lines 450 and 451 leading to a vented waste tank as a bleed point for purge air and contaminants in the system.

Soft purge functions are provided by (normally closed) small, low flow feed valves 452 and 453 associated with each manifold 434, 436, and that are in parallel to main purge feed valves 422, 424. These soft purge feed valves 452, 453 are operated by solenoids 454 and 455 for soft purge flow introduction, under the control of the controller.

The small soft purge feed valves 452 and 453 restrict the flow of purge air to the liquid fuel manifold and fuel nozzles during the initiation phase of purging the liquid fuel system. The soft purge feed valve slowly meters the introduction of purge air to the fuel nozzles to avoid too strongly flushing liquid fuel out of the nozzles and into the combustion cans in order to minimize transient power surges in the turbine and to reduce the risk of combustion flame out. The independently controlled components of the double block-and-bleed system provide greater flexibility in all aspects of purge system operation, than was available in prior systems.

The compressor discharge air from discharge port 402 is fed through the pressure ratio control valve 421 to feed the atomizing air manifold 406 which directs air to the combustion cans into the liquid fuel nozzles 300.

While the gas turbine burns liquid fuel, compressor discharge air from port 202 is supplied to the atomizing air compressor 404, and the purge system is closed off by the motor actuated bypass valve 14. The atomizing air pressure is boosted by the atomizing air compressor 404 to provide better atomization of the liquid fuel in the combustion can. The atomizing air passes through the pressure ratio control valves 420, 421, and is routed to atomizing air manifold 406 which distributes atomizing air to the combustion cans and the atomizing air ports of the liquid fuel nozzles 300 via 204.

When liquid fuel is flowing to the combustion system of the gas turbine, the purge system 448 is inoperative, and the isolation valves 440 for each combustion can are closed to prevent backflow of fuel into the purge system. During liquid fuel operation, the main purge feed valve 422 for the liquid fuel purge system 458, is also closed and the drain valve 444 is open to allow any purge air or fuel leakage that reaches the liquid fuel manifold to drain out of the gas turbine.

The water injection purge system 456 is in operation until water injection flow is called for. Similarly, the water injection purge system 456 has isolation valves 441 for each combustion can that are coupled to the water injection purge manifold 436. The water injection isolation valves are closed when the water injection stop valve (not shown) opens. Water injection in the combustion cans allows water to flow to the combustion system to reduce emissions during the burning of liquid fuel. When water is injected into the combustion cans, the purge system isolation valves 441 are closed to prevent backflow of water into the purge system 456. The main purge feed valve 424 is also closed and the drain valve 445 is open to allow any water or purge air leakage to drain.

Water injection to the combustor may be turned off when the gas turbine is operating at high loads and while burning liquid fuel. Because the water injection system is turned off, the water purge system 456 is started, but the liquid fuel purge system 458 remains off. Moreover, the water injection purge system 456 operates in this circumstance, while the atomizing air compressor 404 continues to provide atomizing air for the burning of liquid fuel.

To run the atomizing air compressor 404 simultaneously with the water purge system 456, back pressure is applied to the atomizing air compressor 404 by closing valve 421 to operate in a safe envelope on the compressor curve while the water injection purge system is on.

The atomizing air pressure ratio valve 420 is open during liquid fuel operation, and closed during gas fuel operation. When a gas turbine transitions from liquid to gas fuel operation, the atomizing air compressor 404 is left on for a short period of time. Valve 420 is closed as the liquid fuel purge system 458 is initiated to reduce the purge air pressure during the soft purge introduction through the small feed valve 452. The atomizing air pressure ratio valve 420 is opened again for a short period to provide high pressure and flow to scavenge clear the liquid fuel nozzles. The valve 420 is then closed again prior to turning off the atomizing air compressor 404.

For startup reliability, the atomizing air compressor bypass valve 414 and the atomizing air pressure ratio valves 420, 421 have both closed and open position switches 460, 464, 462, respectively. These switches are used for startup position confirmation as pressure ratio detection is not reliable at the time of startup due to very low compressor discharge pressures. At other times, the position switches 460, 462, 464 serve to provide an alarm indication to the controller.

The purge air pressure is monitored in the purge systems at the manifolds 434, 436, 406, for the liquid fuel purge, the water injection purge and the atomizing air. The pressure in these manifolds is monitored by comparing the compressor discharge pressure at port 402 with the pressure in the manifold. Delta pressure transducers 466, 467 and 501 are connected to the manifolds are used by the controller to calculate a pressure ratio relative to the compressor discharge pressure. An alarm is provided in the event the ratio falls below a preset limit, and there is an action taken if the ratio falls farther below a preset limit. A possible action will be to take the gas turbine off line to protect the nozzles. The delta pressure transducers attached to the manifolds 434, 436 for the purge systems 458, 456 also track the manifold pressures to control the operation of the soft purge valves 452 and 453 and soft purge operation during purge startup. The controller opens the valves 452 or 453 when the pressure ratio is at a pre-set low level.

FIG. 6 illustrates a current purge system used and described above generally at 400 showing the equipment which would be eliminated (in phantom box 500) when implementing a liquid fuel nozzle cartridge 300 in accordance with an exemplary embodiment described with reference to FIGS. 3–5 It is elimination of the equipment designated within box 500 which provides the cost savings. For example, elimination of the water injection purge system 456 in a current FA class unit manufactured by the assignee of the present application allows for considerable cost savings. The liquid fuel nozzle in accordance with an exemplary embodiment of the present invention is retrofittable to the current combustors in use, and is not limited to a new unit design.

The air purge serves four purposes: 1) to scavenge out any residual fuel or fluid left behind from prior operation, 2) to keep the fuel system components cool, and 3) to prevent ingestion of combustion gases through the fuel nozzles, and 4) to keep fluid from the adjacent nozzles from back flowing into another passageway. While operation of the water injection system is limited to mid to high load operation, it must be purged when not in use to on either fuel. The above described liquid fuel nozzle system and method does not require a dedicated purge system for the water injection passage way, or in effect make it a purge-less water passageway, while still meeting the cooling requirements and providing backflow protection. The elimination of the dedicated water injection purge results in substantial material cost saving and elimination of possible system failure, which can cause the shutting down of the gas turbine, loss of revenue, and generation power. For example, elimination the dedicated water injection purge results in elimination of a water purge spike, which can lead to a combustor flame out.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of protecting a liquid fuel nozzle used in a dual-fuel gas turbine having a compressor, a combustor, and a turbine, the method comprising:

flowing one of liquid fuel and purge air via a fuel passageway into the combustor;

flowing atomizing air into the combustor via a first passageway having a first swirler; and interconnecting said first passageway with a second passageway having a second swirler, said first passageway disposed adjacent to said second passageway, via a conduit connected at a location upstream of the first swirler and downstream of the second swirler, to enable fluid flow therebetween to protect the nozzle from ingestion of hot combustor gases.

2. The method according to claim 1 further comprising:

flowing said atomizing air into the combustor via said second passageway from an air source without a dedicated purge air system for said second passageway.

3. The method according to claim 2 further comprising:

flowing water into the combustor via said second passageway wherein said flowing of said atomizing air via said second passageway from said air source without said dedicated purge air system for said second passageway reduces a risk of combustor flame-out due to excessive rapid introduction of said water into the combustor.

4. The method according to claim 2 further comprising:

flowing water into the combustor via said second passageway wherein when an operation of the turbine switches from liquid fuel to gaseous fuel, any said water downstream of said second swirler disposed in said second passageway is atomized by the atomizing air prior to entering the combustor.

5. A method for operating a dual fuel gas turbine having a combustor, a compressor and a turbine, the method comprising:

supplying liquid fuel to the combustor via a nozzle having a plurality of passageways, a first one of said passageways being a water injection passageway;

interconnecting said water injection passageway to a second one of said plurality of passageways via a conduit to enable fluid flow therebetween, said second one of the plurality of passageways flowing high pressure air; and protecting the nozzle from ingestion of backflow combustion gases by diverting high pressure air from the second one of said plurality of passageways into said water injection passageway via said conduit.

6. The method according to claim 5 further comprising:
flowing said high pressure air into the combustor via said water injection passageway from an air source without a dedicated purge air system for said water injection passageway.

7. The method according to claim 6 further comprising:
flowing water into the combustor via said water injection passageway wherein said flowing of said high pressure air via said water injection passageway from said air source without said dedicated purge air system for said water injection passageway reduces a risk of combustor flame-out due to excessive rapid introduction of said water into the combustor.

8. The method according to claim 6 further comprising:
flowing water into the combustor via said water injection passageway wherein when an operation of the turbine switches from liquid fuel to gaseous fuel, any said water downstream of a first swirler disposed in the water injection passageway is atomized by the atomizing air prior to entering the combustor.

9. In a dual-fuel gas turbine having a compressor, a combustor, and a turbine, a method of protecting a liquid fuel nozzle from ingestion of backflow combustion gases, the method comprising:
flowing water into the combustor via a water injection passageway having a first swirler; flowing high pressure air into the combustor via a first passageway a second swirler; and interconnecting said first passageway and the water injection passageway via a conduit connected at a location upstream of the second swirler and downstream of the first swirler, to direct flow of high pressure air from said first passageway to said water injection passageway into the combustor.

10. In a gas turbine having a compressor, a combustor and a turbine, a liquid fuel unit for flowing liquid fuel into the combustor via a nozzle assembly, the nozzle assembly comprising:
passageways for flowing a liquid fuel, water and high pressure air, respectively, into the combustor; a conduit interconnecting said water passageway and said high pressure air passageway enabling diversion of at least a portion of the high pressure air flow from said high pressure air passageway into said water passageway via said conduit to protect the nozzle from ingestion of hot combustor gases;
a first swirler arranged in the water passageway; and
a first end of said conduit being coupled to said water passageway downstream of said first swirler and an opposite second end of said conduit being in communication with the high pressure air passageway, the first end or said conduit being in communication with said water passageway downstream of said first swirler.

11. A nozzle assembly according to claim 10, including a second swirler disposed in the high pressure air passageway, the second end of said conduit being in communication with said high pressure air passageway upstream of said second swirler.

12. A liquid fuel nozzle assembly for supplying liquid fuel to a combustor of a gas turbine, the nozzle assembly comprising:
a water injection passageway for flowing water into the combustor;
an air passageway disposed adjacent to the water injection passageway for flowing atomizing air into the combustor, the water injection passageway and the atomizing air passageway being interconnected by a conduit to enable flow therebetween to protect the nozzle from ingestion of hot combustor gases;
a first swirler unit disposed in said water injection passageway;
a second swirler unit disposed in said air atomizing passageway, said first and second swirler units disposed proximate an exit of said respective water injection passageway and atomizing air passageways, said first and second swirler units acting as primary pressure drops in the respective passageways; a first end of said conduit being in communication with said water injection passageway at a location downstream of said first swirler unit and an opposite second end of said conduit being in communication with said atomizing air passageway at a location upstream of said second swirler unit.

13. A nozzle assembly according to claim 12 wherein the atomizing air passageway is maintained at a higher pressure than the water injection passageway.

14. The nozzle assembly according to claim 12 wherein said conduit allows for eliminating a dedicated purge air system for the second passageway.

15. The nozzle assembly according to claim 14 wherein said eliminating said dedicated purge air system for the second passageway reduces a risk of combustor flame-out due to excessive rapid water introduction into the combustor.

16. The nozzle assembly according to claim 14 wherein when an operation of the turbine switches from liquid fuel to gaseous fuel, any water downstream of the first swirler in the water injection passageway is atomized by the atomizing air prior to entering the combustor.

17. In a dual-fuel gas turbine baying a compressor, a combustor and a turbine, a method of passively protecting a liquid fuel nozzle, the method comprising:
flowing a liquid fuel, water, and atomizing air into the combustor via respective nozzle passageways;
coupling said water and said atomizing air passageways to one another via a conduit;
diverting at least a portion of high pressure air from said atomizing air passageway into said water passageway to protect the nozzle from ingestion of hot combustor gases;
disposing first and second swirler units for said water and atomizing air passageways, respectively, adjacent exit ends thereof;
coupling a first end of said conduit to said water passageway at a location downstream of said first swirler unit in the water passageway; and
coupling an opposite second end of said conduit to said atomizing air passageway at a location upstream of a second swirler unit in said atomizing air passageway.

* * * * *